Feb. 13, 1940.   W. ENGEL   2,189,889
MOLDED ARTICLE OF SYNTHETIC RESIN
Filed Aug. 4, 1936
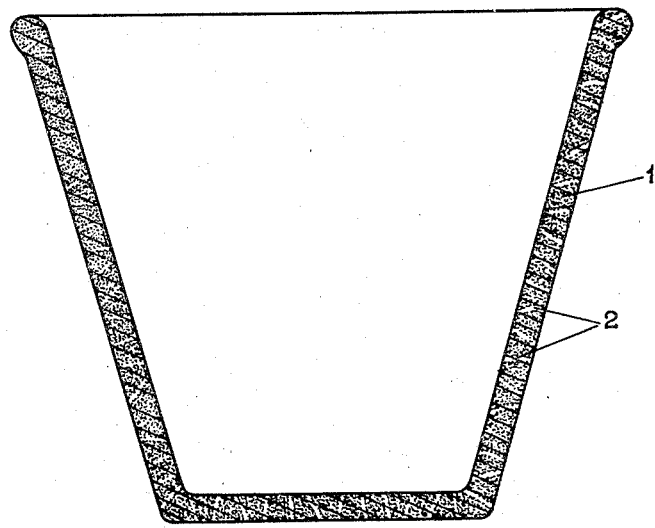
Inventor
Walter Engel
By H. B. Willson & Co.
Attorneys Patented Feb. 13, 1940

2,189,889

UNITED STATES PATENT OFFICE 2,189,889

MOLDED ARTICLE OF SYNTHETIC RESIN

Walter Engel, Friedrichsanfang, Germany

Application August 4, 1936, Serial No. 94,285
In Germany August 3, 1935

2 Claims. (Cl. 47—34)

My invention relates to a plant pot or the like composed of synthetic resin. The main feature of my invention is that pots or the like made of synthetic or artificial resin are provided with fine or capillary canals or pores traversing thoroughly the mass. Such pots or the like are well suited for manifold purposes and excel other known porous articles by advantageous properties.

Flower pots made of artificial resin and provided with traversing canals are distinguished from those of ceramic material by their greater lightness, durability and better appearance, all the more since the usual flower pots offer an ugly, rough exterior if their permeability is not suppressed by a glazing. Flower pots produced according to my present invention from artificial resin with traversing capillary canals are light, practically unbreakable, easy to clean and of pleasing appearance in shape and colour. Furthermore the biological conditions regularly are better fulfilled thereby than with the known ceramic pots, because with a flower pot of artificial resin the dimensions of the canals may be chosen optimally depending on the kind of plant to be set in the pot.

Also it is possible to provide such flower or plant pots from the first with enclosures of plant foods. For instance this may be done by using in the manufacture of the flower or plant pots as a means for the production of the fine or capillary canals traversing the artificial resin such agents which in themselves are nutritive or which are transformed into plant food, when afterwards fluids or gases react on the finished articles. For the formation of the traversing canals and as plant food or as raw materials for the latter water soluble substances of the aforesaid type may be used as well as such material which under the action of the substances contained in the vegetable earth, e. g. the humic acids, may be dissolved. In such a case the flower pot manufactured from the artificial resin with the enclosed plant food or the like may be used such as it comes from the mould, leaving to the practice the gradual extracting of the nutritive material. The flower pot then becomes gradually permeable, according as the food is dissolved in use. But of course it is also possible to make the power pot first in its porous state, i. e. with the pervading fine canals, and fill the latter subsequently with a suitable nutritive agent in fluid or dissolved condition, so that it will be absorbed in the canals of the pot. Finally one may proceed in such a way, that when applying solid plant foods to form the pervading canals of the flower or plant pot, only part of the finely divided plant food is dissolved out of the artificial resin article before utilizing it. Thus flower and plant pots are to be made which at the same time are pervious from the first and contain plant food. As plant food for the indicated purpose any suitable inorganic or organic bodies may be used which are to be employed as or may be converted into plant nutritive substances, such as inorganic and organic salts and other organic compounds, oxides and metals to be dissolved by acids or bases, chemical elements like iodine or sulphur and the like. Instead of the plant food any other inclusions for the flower pot are possible, suited to promote the growing of the plants to be cultivated in it or to prevent or suppress the growing of weeds, parasites or other infesting agents.

The term artificial or synthetic resin in the sense of the present invention comprises all the condensation and polymerisation resins, consequently the phenolic and the amino plastics in the most extensive meaning, e. g. the phenol (cresol etc.) formaldehyde and alkyl and arylamine formaldehyde condensation products, the condensation products of urea and its derivatives, furthermore the ketone and hydrocarbon formaldehyde condensates and similar materials produced by the aid of other aldehydes. Furthermore this term includes all plastics prepared from cellulose esters and from casein. In all cases also natural resins like shellac, being partly hardenable, as is known, under certain conditions, furthermore asphalts, copales and other materials may be utilized. Besides the additions needed for the formation of the transpiercing canals or pores and which afterwards are to be removed, the artificial resins may contain the most different fillers and admixtures pertaining thus to the substance of the artificial resin masses itself, like organic and inorganic powders (wood—and cellulose flour, asbestos—and slate flour, silicic acid) furthermore fibres and coloring substances.

The production of the artificial resin objects or articles provided with the pervading canals may be effected by different methods.

Starting from the procedure known in itself, in which to the conveniently powdered artificial resin, e. g. a phenol formaldehyde condensation product, a foreign material afterwards removable is admixed to produce the pores, there are several ways to attain the formation of fine transpiercing canals in the artificial resin article, thus avoiding only a more or less superficial porosity. First the intimate mixture prepared from the artificial resin moulding powder or the like and the admixture serving to form the cavities, e. g. a metal like zinc, or a salt like sodium chloride, is brought by moulding under heat and pressure or by die casting to the desired shape, e. g. that of a flower pot. Then the surface layer of the thus obtained pressed object, the so-called pressing skin, is removed in any suitable manner, for instance by abrasion preferably with a sand blast or on the lathe, or by any other means. When the pressing skin is removed from the moulded artificial resin body the admixtures intended to form the canals are exposed in such a way that, as soon as a solvent for these substances is added, e. g. an acid if a metallic admixture is used, or any other dissolving agent, such as water if a water soluble salt like sodium chloride is used, they readily are attacked by such solvents. It has been proved that it is possible in this way, especially if the particles of the admixture are of convenient dimensions, to dissolve same completely or nearly completely out of the pressed article, thus producing transpiercing fine or capillary canals in the latter. It is, however, not necessary at all to remove the pressing skin completely, i. e. at all places or spots, from the pressed artificial resin article, but under certain circumstances it will do to remove it only at one place or at several places, the solvent for the admixture then penetrating the artificial resin article from said places of the surface and perfectly imbibing its interior. Such an only partial removal of the pressing skin may be desirable in cases where great value is attached to a glossy surface and the preserving of same is desired especially at places visible from without. For instance with flower pots it will, under given circumstances, suffice to remove the pressing skin only at the bottom or on the internal surface wholly or in part.

The total or partial removal of the pressing skin may also be of advantage so far as thereby the efficiency of the artificial resin article with its fine canals can be increased, since, fluid will penetrate and pass it more readily and faster when the pressing skin is removed. Therefore, it may be of advantage to remove the pressing skin also afterwards with such finished porous articles of artificial resin as are produced by a method not needing the dissolving of the admixture.

The dissolving of the admixture (also called interrupters) serving to form the fine transpiercing canals of the article to be produced, may, however, also be performed by subjecting the moulded and pressed artificial resin articles to a changing pressure during the action of the solvent. For this purpose the pressed objects may be submitted for some time to an evacuation before or whilst the solvent is acting on same; when the solvent is absorbed, the article is heated for instance to 120° C., and pressure is applied thereon. In some cases it may suffice to boil for a longer period the artificial resin ware still containing the admixtures, with the solvent and to discontinue the stages of boiling by repeated rapid quenching. Always in these cases it is of importance that the solvent be made to penetrate under pressure the artificial resin object to be provided with the fine canals, and that any gases accumulated in the cavities already existing or formed are removed by evacuation. Also in these methods, the pressing skin of the moulded article may be removed totally or partially before the solvent acts, in order to facilitate or hasten the dissolution of the admixtures.

Instead of liquid solvents vapours or gases with dissolving action on the admixtures or interrupters may be employed. On the other hand as interrupter also such bodies are useful, as volatilize when heated undecomposed or under decomposition, e. g. sublimating organic or inorganic substances, as naphthalene, ammonium chloride or the like. Also when such interrupters are used as are expellable by the mere action of heat it is advisable to remove totally or partially the pressing skin from the moulded and pressed artificial resin objects before they are heated to expel the interrupting bodies. Of course, in order to remove such interrupters expellable by heat, the heating after pressing conveniently takes place at atmospheric pressure or even at reduced pressure, whereby the expulsion of the interrupters is made easier and hastened.

If desired, in all the aforesaid procedures also such interrupters may be used as can influence catalytically the hardening of the employed artificial resins, as it is for instance the case with many metal salts, such as sodium carbonate and others.

As illustrations of the production of artificial resin articles according to the above described procedures the following may serve:

(1) To 60 parts of a moulding mass manufactured of urea formaldehyde resin and common wood cellulose during grinding 40 parts are added of sodium chloride pulverized to a grain size of about 100µ, whereupon the moulding under pressure and heat is executed as usual. After total or partial removal of the pressing skin the salt is dissolved by hot water.

(2) To a moulding mass of the so-called type S, consisting of phenol formaldehyde resin and wood flour, during pulverization after treating on rolls or masticating, equal parts of crystalline soda with a grain size of 300–400µ are added. The further treatment is as in the first example; but instead of water a dilute mineral acid can be utilized for dissolving the interrupter.

(3) Phenolic plastics, i. e. phenol formaldehyde resins without any other fillers are blended with 45% of aluminium powder before they are transformed into the state of a resitol, and are then moulded under pressure and heat. After total or partial removal of the pressing skin the bodies are treated with a mineral acid or with an alkaline lye, whereby the aluminium powder is dissolved and the transpiercing canals are formed.

(4) To a phenolic plastic containing asbestos flour and which is to be worked in the cold, 65% of naphthalene flakes are added. After cold moulding, the pressed objects are further hardened in the heat whereat the naphthalene sublimates out of the solid. Previously the pressing skin may be removed totally or partially. By working in the vacuum the sublimation of the naphthalene is further facilitated.

(5) 100 parts of phthalic anhydride are rolled into polystyrol. After moulding of the mass and total or partial removal of the pressing skin the phthalic anhydride is dissolved by treating with water.

Instead of the kinds of interrupters named in the examples given above, any others may be employed, like oxydes, bases and acids, metals and elements, such as iodine or monoclinic sulphur, organic salts or other organic substances; but always it depends on the possibility to remove such interrupters out of the artificial resin mass by any suitable chemical or physical means.

(6) 50 parts of phenol formaldehyde moulding powder of the trade are mixed uniformly and completely with 50 parts of potassium chloride and afterwards are pressed in a convenient mould in the heat to form a flower or plant pot. After total or partial removal of the pressing skin the potassium chloride is dissolved by water just until porosity begins. Thus a sufficient quantity of potassium chloride is left in the walls of the pot, which during use of the pot gradually are brought into solution by moisture and pass into the garden mould.

The permeable articles according to my invention, consisting essentially of artificial resin and containing only, if desired, the fillers usual for artificial resin moulding masses may also be produced in the following manner without the use of afterwards dissolved interrupters: First from a hardenable artificial resin, preferably from a phenol formaldehyde condensation product, by its transformation into the so-called C-state hardened artificial resin grains are produced and brought by grinding and sieving to the size which fits to attain the desired permeability in the article. These hardened grains then are mixed with an artificial resin still fusible or softening, i. e., for instance with a resin still in the A- or B-state, or not hardenable at all. The thus obtained mixture is pressed or beetled into moulds preferably at atmospheric temperature, the subsequently added artificial resin serving therein as a binder, and the obtained article is dried at corresponding, conveniently increased temperatures, e. g., at 100–200° C., whereby the artificial resin added as a binder may equally be hardened if it is hardenable at all. It has been proved that also by this method articles with pervading fine or capillary canals can be obtained, the permeability of which for gases, vapours and fluids may be fixed in advance by an adequate choice regarding the dimensions of the hardened artificial resin grains. Instead of starting from pure hardened artificial resin grains of the C-state, however, a hardenable artificial resin of the A- or B-state may also be used and absorbed by fillers of usual kind like wood flour, asbestos flour or by any other fibrous material, and the masses thus obtained, if required after suitable grinding and sieving, may be further treated with the binding agent by pressing and drying, as described before. To manufacture the pervious artificial resin objects by a process of this kind, for instance hardened artificial resin grains of about ½ mm. diameter can be used, mixed with about 25% of a binding artificial resin, and then pressed in moulds at a pressure of about 50 kgs./sq. cm.

The described total or partial removal of the pressing skin from the artificial resin objects which are pervious or are to be made so, gives at the same time a means to provide same simply and durably with decorations or with other total or partial surface layers. With the usual articles produced from non-porous artificial resin there are certain difficulties for a decoration by painting or by coating the surface with pigments, metals and the like. The utilized binding agents often adhere only incompletely at the smooth surface of the artificial resin mass. Therefore, when the binding agent weathers away or is chemically or mechanically injured, the decorating layer is readily removed or equally damaged. This happens also if the artificial resin article is decorated with transfer pictures as often done. However, when pervious artificial resin ware according to my present invention is used, even with a very low total volume of the pores and with very small dimensions of the single canals, therefore with but little diminished strength, one succeeds in having the colours and the like absorbed by the surface of the artificial resin object. Depending on the suspending agent of the colour or the like, the decorating means is made to penetrate more or less into the artificial resin object and a more or less perfectly fast colour or decoration is obtained.

This, of course, specially is the case if the pressing skin of the porous artificial resin ware has previously been removed completely or at least at the places to be decorated or coated. Thus, such artificial resin objects the pressing skin of which has been removed totally or partly as described above in order to dissolve the interrupters may afterwards be decorated or be provided with a surface of another kind. Consequently, just those spots which have lost their gloss by the removal of the pressing skin can be embellished in a particular manner. By way of example, for this purpose the pressing skin may be ground off from the artificial resin piece—using a stencil of whatever shape—by a sand blast or the like in the lineation of a decorative design and even without using a stencil the spots thus exposed can be decorated by spraying the object with paint. The latter essentially adheres only to those spots wherefrom previously the pressing skin was removed, so that they alone will appear differently coloured than the rest of the artificial resin article. The analogue applies to the use of Schoop's metal spraying process on porous artificial resin goods freed perfectly or in part from the pressing skin. In some cases also a porosity of the metallic coatings may be reached and in all cases and especially by applying the metal spraying process on the coatings not only decorative but also technical effects may be obtained.

The accompanying drawing illustrates a flower pot constructed according to the invention.

Referring to the drawing, I denotes the body of the flower pot made of porous material in the manner above described. During molding, capillary canals 2 are formed in this body, which canals extend from the inner to the outer face of the pot. On the drawing, the capillary canals are greatly enlarged to make the invention better understood but it will be obvious that in reality they are hardly visible.

I claim:

1. A plant pot made of artificial resin and transpierced by capillary canals.

2. A plant pot made of artificial resin and transpierced by capillary canals, said canals containing substances suitable for ameliorating the growing of plants.

WALTER ENGEL.